(12) United States Patent
Suresh et al.

(10) Patent No.: US 9,441,134 B2
(45) Date of Patent: Sep. 13, 2016

(54) FLUORINATED CORE-SHELL-POLYMERS AND PROCESS FOR PREPARING SAME

(75) Inventors: Parappuveetil Sarangadharan Suresh, Singapore (SG); Yoong Kim, Singapore (SG); Andreas Fechtenkotter, Singapore (SG); Han Hong, Singapore (SG); Christina Li Lin Chai, Auckland (NZ); Xiaogang Yang, Singapore (SG); Yeap Hung Ng, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 1149 days.

(21) Appl. No.: 13/702,094

(22) PCT Filed: Jun. 2, 2010

(86) PCT No.: PCT/EP2010/057720
§ 371 (c)(1),
(2), (4) Date: Feb. 14, 2013

(87) PCT Pub. No.: WO2010/139732
PCT Pub. Date: Dec. 9, 2010

(65) Prior Publication Data
US 2013/0171346 A1    Jul. 4, 2013

(30) Foreign Application Priority Data
Jun. 4, 2009 (EP) .................................... 09161891

(51) Int. Cl.
| | |
|---|---|
| *C09D 133/16* | (2006.01) |
| *C08F 2/22* | (2006.01) |
| *C08F 265/06* | (2006.01) |
| *D06M 15/277* | (2006.01) |
| *C08F 220/24* | (2006.01) |

(52) U.S. Cl.
CPC .............. *C09D 133/16* (2013.01); *C08F 2/22* (2013.01); *C08F 265/06* (2013.01); *D06M 15/277* (2013.01); *C08F 220/24* (2013.01); *Y10T 428/2991* (2015.01)

(58) Field of Classification Search
CPC combination set(s) only.
See application file for complete search history.

(56) References Cited

U.S. PATENT DOCUMENTS

| | | | |
|---|---|---|---|
| 5,057,577 A * | 10/1991 | Matsuo et al. ................ | 525/276 |
| 5,798,406 A | 8/1998 | Feret et al. | |
| 2003/0118722 A1 * | 6/2003 | Lee ....................... | C08F 265/06 427/212 |

FOREIGN PATENT DOCUMENTS

| | | |
|---|---|---|
| JP | 63228069 A | 9/1988 |
| WO | 2009015136 A1 | 1/2009 |

OTHER PUBLICATIONS

Cui et al, Colloids and Surfaces A: Physicochem. Eng. Aspects, 303, pp. 173-178, available online Mar. 23, 2007.*
Cui et al, Colloids and Surfaces A: Physicochem. Eng. Aspects, 324, pp. 14-21, available online Mar. 22, 2008.*
Chen et al, Polymer Preprints, 50(1), pp. 200-201, 2009.*
PCT/EP2010/057720 International Search Report dated Dec. 9, 2010.
BASF SE A*STAR, Intellectual Property Office of Singapore, Written Opinion dated Sep. 3, 2015, SG App, No. 2013051925, 13 p.

\* cited by examiner

*Primary Examiner* — Erma Cameron
(74) *Attorney, Agent, or Firm* — Conley Rose, P.C.

(57) ABSTRACT

Disclosed is a process for preparing fluorinated core-shell polymer particles in which the core is a non-fluorinated polymer and the shell is derived from at least 50% by weight of fluorinated monomers, by 1) synthesizing a core polymer latex by aqueous emulsion polymerization of non-fluorinated monomers forming the core polymer, 2) adding the shell-forming fluorinated monomers or mixtures of at least 50% by weight of fluorinated monomers with non-fluorinated monomers to the core polymer latex of step 1) and allowing for at least one hour of equilibration time in which essentially no polymerization of the shell monomers occurs, 3) reacting the shell-forming monomers in the mixture from step 2) to form the core-shell polymer particles, wherein the process steps 1) to 3) are carried out under mechanical stirring in the absence of surfactants, emulsifiers, emulsifying monomers and mixtures thereof.

12 Claims, No Drawings

US 9,441,134 B2

FLUORINATED CORE-SHELL-POLYMERS AND PROCESS FOR PREPARING SAME

CROSS-REFERENCE TO RELATED APPLICATION

The present application is the U.S. National Stage under 35 U.S.C. §371 of International Patent Application No. PCT/EP2010/057720, filed Jun. 2, 2010, which claims priority to European Patent Application No. 09161891.8, filed Jun. 4, 2009, the disclosures of which are hereby incorporated herein by reference.

FIELD OF THE INVENTION

This invention relates to fluorinated polymer particles in solid state containing no stabilizer or surfactant, especially to fluorinated particles possessing core-shell structure and containing fluorinated polymers only in the shell and non-fluorinated polymers in the core, particularly prepared from fluorine-containing acrylates. This invention also relates to the preparation of the abovementioned fluorinated particles, especially to a process comprising the 1) polymerization of non-fluorinated monomers and fluorinated monomers in water medium in the absence of surfactant and/or emulsifier and/or ionic vinyl monomers, especially to a one-pot reaction process, and 2) isolation of the abovementioned fluorinated particles by removing water and volatiles.

DESCRIPTION OF THE PRIOR ART

Fluorine-containing coatings impart water, oil and soil repellency to textile, paper, and leather surfaces, due to their substantially reduced surface free energy. The improvement of surface properties increases when the weight ratio of the fluorinated component in the coating increases. Due to the expensive nature of fluorinated polymers, the preference is to assemble the fluorinated polymers at the top layer of the coatings to attain the best cost efficiency. The fluorinated polymer particles can be used as additives for the introduction of a functional top layer with fluorinated polymer. However, the preparation of fluorinated particles is tedious and costly. Usually fluorinated particles with a diameter less than 1000 nm can be formed using classical emulsion polymerization, miniemulsion polymerization and microemulsion polymerization. The final product is in a mixture system such as latex or mixtures of solid. The isolation and purification to obtain pure fluorinated particles are inefficient.

Furthermore, due to the poor compatibility and the hydrophobicity of the fluorinated monomers, the incorporation of the fluorinated monomer using an emulsion polymerization system is also difficult to realize. The structures as well as the performance of the final products are strongly dependent on the recipes and procedures of the emulsion polymerization. Fluorine-containing acrylates are usually applied in emulsion polymerization to produce fluorinated latex, which affords fluorinated surface coatings during film formation. Usually a certain amount of surfactants, non-fluoro comonomers or reactive surfmers is needed in the emulsion polymerization process to improve the incorporation of fluorinated monomers or the stability of the final mixture of products.

US 2004/6790898 relates to the preparation of fluorinated core-shell particles with water and oil repellency. The process comprises a shell wherein a large amount of hydrophobic fluorinated monomers are included and a core wherein no fluorinated monomers are included. In the process, a surfactant is used during two-step preparation of the polymer particles. The core of non-fluorinated-polymer is synthesized until a conversion ratio from the monomers to intermediates reaches 70 to 95%. Then, fluorinated monomer only or a mixture of fluorinated monomer and comonomer is added to the shell to obtain the core-shell particle. It is stated that theoretically, it is desirable to add the monomers at the moment when the transition ratio reaches 100%. However, in practice, the moment cannot be predicted.

The process required emulsification of the fluorinated monomers before the addition during the emulsion polymerization. Despite of the need for surfactants, the fluorinated monomers is added into the emulsion at a critical range of conversion of non-fluorinated monomers i.e. 70-95%. In practice, this was very difficult to control. Moreover the final product was a dispersion system with no means of isolating pure fluorinated particles.

In European Polymer Journal 42 (2006), pages 694 to 701 the preparation of emulsifier-free latex of fluorinated acrylate copolymer is described. The lattices are prepared by semi-continuous polymerization in which perfluoroalkylethyl methacrylate is employed as a fluoromonomer. However, sodium-3-allyloxy-2-hydroxy-propanesulfonate is employed as a surfactant monomer (surfmer). The reaction system is treated with ultrasonic waves to help the monomers disperse well in water.

In this process, the reactive emulsifier, sodium 3-allyloxy-2-hydroxy-propanesulfonate (COPS-1) was needed to aid the incorporation of the fluorinated monomers and ultrasonic treatment was needed to assist in the dispersion of the organic compounds into water mediate. The complicated procedure only resulted in particles made of the copolymer of fluorinated monomers combining non-fluorinated monomers with low fluorine content.

A core-shell latex containing fluorinated polymer rich in shell is disclosed in Journal of Applied Polymer Science, Vol. 85, (2002), pages 1147 to 1153. A core-shell latex with polyacrylate rich in core and fluoropolymer rich in shell was prepared by semi-continuous emulsion polymerization in the presence of mixed emulsifiers.

However this process required a mixed surfactant system (including sodium dodecyl sulfate (SDS), OS-15, OP-10, or hexadecyl-trimethylammonium bromide) to stabilize the latex during polymerization. Furthermore, non-fluorinated monomers were needed to aid the incorporation of the fluorinated monomers into the seed particles. The resulted particles comprised the shell with the copolymer of both fluorinated monomers and non-fluorinated monomers. The fluorine content was low.

The preparation of fluorinated monomer-styrene copolymer latex particles in a soap-free emulsion copolymerization is described in Colloid Polym Sci 285 (2006), pages 107 to 111. Soap-free emulsion copolymerization of 2,2,2-trifluoroethyl acrylate with styrene was carried out. However, no core-shell-polymers were prepared.

However, such process was only successful in preparing the particles of the copolymer of styrene and low fluorine-containing monomer such as 2,2,2-trifluoroethyl acrylate. The fluorine content is quite low. Despite of the poor surface property of the attained particles, the particle size distribution was wide without any control.

The synthesis and characterization of emulsifier-free core-shell fluorine-containing polyacrylate latex is disclosed in Colloids and Surfaces A: Physicochem. Eng. Aspects 303 (2007), pages 173 to 178. An emulsifier-free PMMA seed latex is first reacted with methyl methacrylate to form a polymer core. Performing the shell a monomer mixture of 4.125 g dodecafluoroheptyl methacrylate, 10.725 g butylacrylate and 1.015 g methacrylic acid was employed.

However, a large portion of non-fluoro monomers was needed to assist in the incorporation of the fluorinated monomers to non-fluoro polymer seeds. The fluorine-content of the attained particles shell was low.

Moreover, fluorine-containing acrylate monomers are usually very expensive. To improve the efficiency of the fluorinated polymers in the coating system, the most attractive way is to prepare core-shell particles with the fluorinated polymer as shell and non-fluorinated polymers as core. While the fluorinated shell provides the desired surface properties, the non-fluorinated core provides the compatibility of the particles with other components.

However, the incorporation of fluorinated monomers into colloidal particles is not straightforward. Due to the poor hydrophilicity and immiscibility of such fluorinated monomers, a tedious feeding process and/or complicated recipe of surfactant and additives are usually employed in such emulsion polymerization. Moreover the attained latex is a water dispersion of fluorinated particles with various surfactants, stabilizers and other additives and such fluorinated particles system can be used only in a water-based system. Meanwhile those additives also decrease the efficiency of fluorinated polymer in terms of improving the surface performance.

It should be noted that the use of non-fluorinated monomers to improve the incorporation of fluorinated monomers would result in a copolymer shell with non-fluoro components and fluoro components and this would greatly decrease the fluorine density in the shell and consequently affect the desired surface performance of the particles. Using surfactants to improve the incorporation of the fluorinated monomers would result in latex with amphiphilic components while greatly reducing the desired surface properties of fluorinated polymers. Meanwhile the removal of surfactants from the latex and isolation of the attained fluorinated particles turned out to be a high cost process, if possible at all.

As discussed in the above prior art, the isolated core-shell fluorinated particles with pure fluorinated polymer as shell and non-fluorinated polymer as core is of great value in applications as additives in various coatings. The efficient preparation of such core-shell fluorinated particles with preferably pure fluorinated polymer in the shell is in high demand. No such particles and the preparation have been reported yet.

SUMMARY OF THE INVENTION

The object underlining the present invention is to provide process for preparting fluorinated core-shell-polymer particles wherein the process can be carried out in the absence of surfactants, emulsifiers, emulsifying monomers or mixtures thereof, and wherein a high amount of fluorinated monomer can be included in the polymer shell.

The object is achieved by a process for preparing fluorinated core-shell polymer particles in which the core is a non-fluorinated polymer and the shell is derived from at least 50% by weight of fluorinated monomers, by
1) synthesizing a core polymer latex by aqueous emulsion polymerization of non-fluorinated monomers forming the core polymer,
2) adding the shell-forming fluorinated monomers or mixtures of at least 50% by weight of fluorinated monomers with non-fluorinated monomers to the core polymer latex of step 1) and allowing for at least one hour of equilibration time in which essentially no polymerization of the shell monomers occurs,
3) reacting the shell-forming monomers in the mixture from step 2) to form the core-shell polymer particles, wherein the process steps 1) to 3) are carried out under mechanical stirring in the absence of surfactants, emulsifiers, emulsifying monomers and mixtures thereof.

Preferably the shell is derived from at least 75% by weight, more preferably at least 85% by weight, more preferably at least 95% by weight, specifically at least 99% by weight or 100% by weight of fluorinated monomers.

Furthermore, the object is achieved by a fluorinated core-shell-polymer particle obtainable by the above process.

Furthermore, the object is achieved by a fluorinated core-shell-polymer, in which the core is a non-fluorinated polymer and the shell is derived from at least 50% by weight of fluorinated monomers, the polymer being free from surfactants, emulsifiers and emulsifying monomers.

The fluorinated core-shell-polymers can be used for forming a solid water-, oil- and soil-repellent coating on solid surfaces.

The invention also relates to a process for forming a solid water-, oil- and soil-repellent coating film on solid surfaces, involving the steps of
a) casting a coating film of an aqueous latex dispersion containing fluorinated core-shell particles as defined above on a solid surface,
b) evaporating the aqueous dispersion medium and
c) annealing the coating film.

The aqueous latex dispersion may contain a mixture of fluorinated core-shell polymer particles as defined above admixed with non-fluorinated polymer particles.

The present invention provides fluorinated particles possessing a core-shell structure with preferably pure fluorinated polymers as shell and non-fluorinated polymers as core to overcome the drawback of the mixed systems of conventional fluorinated particles in the applications as additives in coatings, such as large quantity of fluoro component, poor compatibility and uneven surface. The present invention also provides a simple low cost process for the preparation of abovementioned fluorinated polymer particles. The process comprising the 1) emulsion and/or dispersion polymerization of non-fluorinated monomers and fluorinated monomers in water medium in the absence of surfactant and/or emulsifier and/or ionic vinyl monomers, especially in a one-pot reaction process, and 2) isolation of the abovementioned fluorinated particles by removing water and volatiles.

The present invention is characterized by fluorinated particles possessing a core-shell structure containing preferably pure fluorinated polymers in the shell and non-fluorinated polymers in the core.

The present invention is also characterized by the absence of surfactant and/or emulsifier and/or ionic vinyl monomers in the preparation of the non-fluorinated polymer core and the fluorinated polymer shell.

The present invention is also characterized by the heterogeneous polymerization of non-fluorinated monomers and fluorinated monomers in a water medium.

The present invention is also characterized by the highly efficient preparation of abovementioned core-shell fluorinated particles from high fluorinated content monomers.

The abovementioned core-shell fluorinated particles have a wide application as additives for various coatings (such as water-borne coatings, organic coatings, powder coatings and surface varnishing materials), for high performance inks and for plastic devices from an extruding process.

DETAILED DESCRIPTION OF THE INVENTION

This invention provides fluorinated particles with core-shell structure containing fluorinated polymers in the shell and non-fluorinated polymers in the core. As distinguished from other systems with related polymer composites which are always in a mixture of solid or dispersion in water, this invention provides fluorinated particles which have many advantages in practical applications, such as improved surface properties, easy application and wide application-range due to the lack of interference from impurities.

This invention also provides fluorinated particles with polymers from only fluorinated monomers as shell which greatly improves the efficiency of fluorinated polymers with regards to obtaining desired surface properties such as water repellence, oil repellence, weather durability and chemical resistance, compared with those particles with the copolymers of fluorinated monomers and non-fluorinated monomers in the shell.

In the process for preparing the fluorinated core-shell-polymer particles the core is a non-fluorinated polymer and the shell is derived from at least 50% by weight of fluorinated monomers, by
1) synthesizing a core polymer latex by aqueous emulsion polymerization of non-fluorinated monomers forming the core polymer,
2) adding the shell-forming fluorinated monomers or mixtures of at least 50% by weight of fluorinated monomers with non-fluorinated monomers to the core polymer latex of step 1) and allowing for at least one hour of equilibration time in which essentially no polymerization of the shell monomers occurs,
3) reacting the shell-forming monomers in the mixture from step 2) to form the core-shell polymer particles, wherein the process steps 1) to 3) are carried out under mechanical stirring in the absence of surfactants, emulsifiers, emulsifying monomers and mixtures thereof.

The equilibration in step 2) is preferably performed for at least 3 hours, more preferably at least 10 hours. For example, the equilibration can take 1 to 50 hours, more preferably 2 to 30 hours.

Between steps 1) and 2), a cleaning step for isolating the core-polymer particles from the latex may be performed. However, it is easier and preferable according to the present invention, to directly add the shell-forming fluorinated monomers to the as-obtained core-polymer latex of step 1).

In step 2) essentially no polymerization of the shell monomers occurs. This is normally achieved by not adding a polymerization starter in step 2), but only by introducing the polymerization starter in step 3) after the equilibration time. Furthermore, the equilibration is normally performed at a temperature lower than the polymer formation temperature. In the equilibration time, the fluorinated monomers can adhere to the surface or diffuse into the outer sphere of the core-polymers allowing for a durable compact of core-polymer and shell-polymer.

The synthesizing to form the core-polymer latex in step 1) and the reacting of the shell-forming monomers in step 3) are preferably free radical polymerizations. Preferably, in steps 1) and 3), not in step 2), free-radical polymerization starter is added to perform the free-radical polymerization.

The process thus comprises the heterogeneous polymerization of non-fluorinated monomers in water medium to form the non-fluorinated polymer particles as seed and the heterogeneous polymerization of fluorinated monomers to build the shell structure on the attained seed particles to form the abovementioned core-shell fluorinated particles and optionally the isolation of the obtained particles. The isolation of the abovementioned particles can be carried out by simple filtration or evaporation of the volatiles and water. In the abovementioned process, no surfactants, no surfmer or stabilizer additives were involved. Added advantages are the ease of operation and low cost.

This invention also provides a one-pot process for the preparation of the abovementioned core-shell fluorinated particles.

Herewith is a more detailed description of the above mentioned particles.

The core of the abovementioned particles is made of non-fluorinated polymers from heterogeneous polymerization of non-fluorinated monomers in water. Such core particle is preferably spherical in shape. The size of such core particles can be controlled in a range of preferably 50 to 1000 nm, more preferably 100 nm to 500 nm by controlling the polymerization conditions such as recipe, feed ratio, feeding rate, temperature, stirring speed and the design of the reactor as well as the stirrer. The particle size distribution can also be controlled by controlling the polymerization conditions during the polymerization. Very narrow size distribution of the core particle made from poly(methyl methacrylate) can be obtained.

The average particle diameter of the final particles is preferably in the range of from 80 to 800 nm.

Preferably, the non-fluorinated monomers for forming the core-polymer, are selected from the group consisting of acrylate-based monomers, methacrylate-based monomers, styrene-based monomers, vinyl-based monomers and mixtures thereof. Preferred are $C_{1-12}$-alkyl(meth)acrylates.

Non-fluorinated monomers can thus be any one of the special monomers or a mixture containing at least one special monomer from the following families: acrylates, methacrylates, acrylamides, methacrylamides, vinyl benzenes, vinyl esters, vinyl siloxanes and other types of free radical polymerizable compounds.

The fluorinated particles with core-shell structure containing fluorinated polymers in shell are spherical. The overall content of fluorinated polymer can be from 1 wt % to 50 wt % preferably 5 wt % to 30 wt %. The fluorinated polymers are preferably made of acrylates or methacrylates containing fluorocarbon-alkyl groups. The number of fluorine atoms in the alkyl groups can be 1 to 40, preferably 4 to 20. The fluorocarbon-alkyl groups can bear linear, branch and cyclic moieties. The size of the fluorinated particles can be controlled by controlling the reaction conditions such as recipe, feed ratio, feeding rate, temperature, stirring speed and the design of the reactor as well as the stirrer. The particle size distribution can be also controlled by controlling the polymerization conditions during the polymerization process. The particles containing fluorinated polymers in the outer shell can be confirmed by X-ray photoelectron spectroscopy (XPS characterization).

Herewith is a more detailed description of each of the preparation step.

The preparation of the abovementioned core-shell fluorinated particles preferably comprises the preparation of non-fluorinated polymer particles in water medium; the preparation of core-shell fluorinated particles in water medium and isolation of core-shell fluorinated particles. The most distinguishing feature of this process is no surfactant and/or emulsifier and/or ionic vinyl monomer is involved in the whole procedure.

The preparation of the core of the abovementioned particles can be carried out in a simple batch reactor equipped with effective stirrer system and thermo managing system. De-ionized water, non-fluorinated monomers and water soluble free radical initiator were de-aerated carefully. Several techniques can be employed to de-aerate the system, for example, purging the liquid and the reactor with pure inert gas such as nitrogen gas, argon gas or $CO_2$; freeze-pump-thaw or air-free operations. Then the reactor is kept under inert atmosphere during the polymerization. The polymerization is initiated by the free radicals generated from the water soluble initiator system. The initiating radical can be generated from the thermo decomposition of the initiator species or the redox reaction of initiator systems. The rate of the polymerization, the particle concentration, the size and the size distribution of the attained non-fluorinated particles can be controlled by controlling reaction conditions such as recipe, feed ratio, feeding rate, temperature, stirring speed and the design of the reactor as well as the stirrer. To obtain suitable non-fluorinated particles, which can be used as seeds to form the core of fluorinated particles, the particles size can be of the range of 50 nm to 1000 nm, preferably between 100 nm to 500 nm. The concentration of the non-fluorinated particles in water can be of solid content of 1 to 40 weight percent in the water medium, preferably between 2 to 20 weight percent. The feed ratio of the initiator can be of the range of 0.1 to 5 weight percent of the monomer, preferably between 0.5 to 2 weight percent. The feeding rate of the initiator solution can be of the range of 0.01 ml/min to 10 ml/min, preferable between 0.1 to 5 ml/min. The stirrer system can be a mechanical stirring system or magnetic stirring system. The shearing force can be adjusted by changing the shape of stirrer and the rotating speed. The rotating speed can be of the range of 50 to 1000 rpm. The temperature of the reaction system can be controlled with the thermo managing system. The reaction temperature can be of the range of 40 to 85 degree centigrade, preferably between 50 to 75 degree centigrade. The reactor can be the stirred tank reactor with or without baffle or a round bottomed flask. The stirrer can be an anchor stirrer or pitched blade turbine or retreat curve impeller.

The preparation of core-shell fluorinated particles can be carried out in the same reactor as a one-pot process. It also can be carried out in other reactors having similar setup. The fluorinated monomers are de-aerated and charged into the reactor at a controlled rate. A very important factor for obtaining well defined core-shell fluorinated particles is the polymerization rate of the fluorinated monomers. Due to the poor affinity between the fluorinated monomers and non-fluorinated polymer particles, a slow polymerization of fluorinated monomers is required to prevent the homo-nucleation of the fluorinated monomers which will result in the formation of fluorinated particles without non-fluorinated polymer core. This is especially important when high fluorine-containing (>55 wt %) monomers are used to make the core-shell fluorinated particles. A narrow window of polymerization rate should preferably be maintained. This results in a poor efficiency in the preparation of core-shell fluorinated particles from high fluorine-containing monomers.

It is well known that the properties of the fluorinated polymers increase with the increase of the fluorine content in the polymer. Moreover, high fluorine-content monomers impart better properties to the final product than low fluorine-content monomers do.

In this invention, two methods have been developed to improve the efficiency in the preparation of core-shell fluorinated particles from high fluorine-content monomers. The fluorinated polymer shell can be built successfully with high efficiency using either one of the procedures below:

1. Using mixed fluorinated monomers as feed materials.
2. Applying a step feeding process.

When mixed fluorinated monomers are used to build the fluorinated shell on non-fluorinated core particles, the high fluorine-content monomers can be mixed with low fluorine-content monomers and the portion of high fluorine-content monomers can be of 70 to 95 weight percent. The monomers with low fluorine content possess better affinity with non-fluorinated core polymer particles and can form homo-polymers or copolymers with high fluorine-content monomers on the non-fluorinated core which facilitates the shell formation from high fluorine-content monomers. An alternative process is the application of a step feeding process. In the first step, a small amount of low fluorine-content monomers is introduced into the non-fluorinated particle system to form a shell structure using a carefully controlled polymerization. The resulting core-shell particles have improved affinity to high fluorine-containing monomers. In the second step, high fluorine-content monomers are introduced to the system resulting from the first step. This invention provides a highly efficient process for the preparation of core-shell fluorinated particles from a wide range of fluorinated monomers as well as a wide window of polymerization rates.

The final step to isolate the attained core-shell fluorinated particles can be carried out by various techniques for the removal of water and volatiles such as filtration, centrifuge or simple air drying.

For forming solid water-, oil- and soil-repellent coating films on solid surfaces, a coating film of an aqueous latex dispersion containing fluorinated core-shell-polymer particles defined above is cast on a solid surface. Subsequently, the aqueous dispersion medium is evaporated, and the coating film is annealed.

According to the present invention it is possible to use an aqueous latex dispersion which furthermore contains non-fluorinated polymer particles in addition to the fluorinated core-shell-polymer particles as defined above. Upon water evaporation of the cast film, fluorinated latex particles migrate to the surface of the blended film. Upon annealing, a surface film of fluorinated core-shell-polymer is formed with an underlying film of the non-fluorinated polymer particles. In this way, a dense fluorine packing on the coating surface can be achieved without using large amounts of fluorinated core-shell-polymer particles.

The present invention will be described in further detail with reference to examples as embodiments.

EXAMPLES

Example 1-3

The Preparation of Core-Shell Fluorinated Particles with PMMA in the Core and poly(2,2,3,3-tetrafluoropropyl acrylate) in the Shell Example 1

One-Pot Process

The particles of PMMA were prepared via heterogeneous polymerization in water without emulsifier and the core-shell particles made from fluoro-polymers bearing short pendant side group can be achieved by a simple two-stage method.

The emulsifier-free polymerization of methyl methacrylate was carried out under nitrogen in a 50 mL two-neck round bottom flask equipped with magnetic stirrer and sealed by rubber septum. 1 mL of distilled MMA was introduced into the flask containing 20 mL of deionized water (degassed by nitrogen) with a stirring rate of 700 rpm. The oil-in-water suspension was heated to 70° C. in an oil bath for a 30-minute equilibration time. 0.25 mL water solution of ammonium persulfate (34.13 mg/mL) was injected into the mixture. The mixture changed from semi-transparent to opaque-white color after 1 hour. The reaction mixture was cooled slowly with stirring to ambient temperature after a 20 hour reaction time. A PMMA dispersion in water (solid content ~5%) was obtained.

TABLE 1

Recipe for emulsifier-free polymerization to produce PMMA seed dispersion

| Component | Amount | mMole |
|---|---|---|
| Methyl methacrylate | 1 mL | 9.3488 |
| Water | 20 mL | |
| Ammonium Persulfate | 8.53 mg | 0.0374 |
| Emulsifier | — | — |

Reaction Temperature: 70° C., Stirring Rate: 700 rpm, Reaction Time: 20 hr

Without further purification, 0.1 mL of fluoro monomer (2,2,3,3,-tetrafluoropropyl acrylate) was added to the as-prepared PMMA dispersion (solid content ~5%) at room temperature, with $N_2$-purged needle. The mixture was stirred for 24 hours. The mixture was then heated to 70° C., and a water solution of ammonium persulfate (1 mol % with respect to charged monomer) was injected to trigger the polymerization. After 24 hours, the dispersion was cooled to room temperature and poured into a Petri dish. After one day, the water and volatiles had evaporated, leaving a homogeneous brittle layer of dried particles. The solid was dried at 60° C. for 1 day.

The fluoropolymer content of the attained particles was determined by proton NMR, in $CDCl_3$. It had been found that the fluoropolymer content with respect to PMMA core was 10.6 wt %. The size of attained PMMA particles ranged from 250~350 nm.

Example 2

For the scale up process, the emulsifier-free polymerization of methyl methacrylate was carried out under nitrogen in a 200 mL two-neck round bottom flask equipped with magnetic stirrer and sealed by rubber septum. 4 mL of distilled MMA was introduced into the flask containing 80 mL of deionized water (degassed by nitrogen) with a stirring rate of 700 rpm. The oil-in-water suspension was heated to 70° C. in an oil bath for 30-minutes to equilibrate. A water solution of ammonium persulfate (34.13 mg) was injected into the mixture. The nucleation process was observable after stirring for 10 minutes. The mixture changed from semi-transparent to opaque-white color after 1 hour. After 20 hours, the reaction mixture was heated to 80° C. for 1 hour in order to drive the reaction to completion. The emulsion was cooled slowly to ambient temperature after that with stirring.

TABLE 2

Recipe for emulsifier-free polymerization to produce PMMA seed dispersion

| Component | Amount | mMole |
|---|---|---|
| Methyl methacrylate | 4 mL | 37.4 |
| Water | 80 mL | |
| Ammonium Persulfate | 34.1 mg | 0.1495 |
| Emulsifier | — | — |

Reaction Heating Profile: 70° C./20 hr, 80° C./2 hr, Stirring Rate: 700 rpm

Without further purification, 20 mL of the as-prepared PMMA dispersion was taken from the attained dispersion and degassed with Argon for 20 minutes. 0.1 ml of fluoro monomer (2,2,3,3,-tetrafluoropropyl acrylate) was added into the seed dispersion at room temperature, using an Ar-purged needle. The mixture was stirred for 24 hours. The mixture was then heated to 70° C., and a water solution of ammonium persulfate (1 mol % with respect to charged monomer) was injected to trigger the polymerization. After 24 hours, the dispersion was cooled down to room temperature and poured into a Petri dish. After one day, the water and volatiles had evaporated, leaving a homogeneous brittle layer of dried particles. The solid was dried at 60° C. for 1 day.

The fluoropolymer content in the attained particles were determined by proton NMR, in $CDCl_3$. It had been found that the fluoropolymer content with respect to PMMA core was 11.4 wt %. The size of the attained PMMA particles ranged from 250~350 nm.

Example 3

To further increase the capacity of the preparation, a 250 mL scale-up was carried out at the same temperature and targeted solid content. For this process, the emulsifier-free polymerization of methyl methacrylate was carried out under nitrogen in a 500 mL three-neck round bottom flask equipped with a mechanical stirrer (stainless steel rod with Teflon blade) and the two side necks were sealed by rubber septum. 250 mL degassed DI water was charged into the flask, followed by 12.5 mL of distilled MMA. With a stirring rate of 400 rpm, the oil-in-water suspension was heated to 70° C. in an oil bath for 30-minutes to equilibrate. 0.5 mL water solution of ammonium persulfate (106.7 mg) was injected into the mixture. The nucleation process was observable after stirring for 10 minutes. The mixture changed from semi-transparent to opaque-white color after 2 hour. After 20 hours, the reaction mixture was heated to 80° C. for 2 hours in order to consume all the APS. After that, the emulsion was cooled slowly to ambient temperature with stirring.

TABLE 3

Recipe for emulsifier-free polymerization to produce PMMA seed disperson

| Component | Amount | mMole |
|---|---|---|
| Methyl methacrylate | 12.5 mL | 116.9 |
| Water | 250 mL | |
| Ammonium Persulfate | 106.7 mg | 0.4676 |
| Emulsifier | — | — |

Reaction Heating Profile: 70° C./20 hr, 80° C./2 hr, Stirring Rate: 400 rpm (mechanical stirrer)

The average particle size produced in the large scale reaction was ca. 450 nm, which was much larger than the particles obtained in a smaller scale, d(0.5)~295 nm.

Without further purification, 20 mL of the as-prepared PMMA dispersion was taken from the attained dispersion and degassed using Argon for 20 minutes. 0.1 mL of fluoro monomer (2,2,3,3,-tetrafluoropropyl acrylate) was added into the seed dispersion at room temperature, using a Ar-purged needle. The mixture was stirred for 24 hours. The mixture was then heated to 70° C., and water solution of ammonium persulfate (1 mol % with respect to charged monomer) was injected to trigger the polymerization. After 24 hours, the dispersion was cooled down to room temperature and poured into a Petri dish. After one day, the water and volatiles had evaporated, leaving a homogeneous brittle layer of dried particles. The solid was dried at 60° C. for 1 day.

The fluoropolymer content in the attained particles was determined by proton NMR, in $CDCl_3$. It had been found that the fluoropolymer content with respect to PMMA core was 11.2 wt %. The size of the attained PMMA particles ranged from 295~450 nm.

Examples 4-6

The Preparation of Core-Shell Fluorinated Particles with PMMA in the Core and poly(2,2,3,4,4,4-hexafluorobutyl acrylate) in the Shell Example 4

Following the same procedure as described in example 1, the core-shell fluorinated particles was prepared by using same quantity of 2,2,3,4,4,4-hexafluorobutyl acrylate instead of 2,2,3,3,-tetrafluoropropyl acrylate in the shell-building step. The fluoropolymer contents in the attained particles was determined by proton NMR, in $CDCl_3$. It had been found that the fluoropolymer content with respect to PMMA core was 14.75 wt %. The morphology of attained PMMA particles with the size range of 250~350 nm.

Example 5

Following the same procedure as described in example 2, the core-shell fluorinated particles was prepared by using same quantity of 2,2,3,4,4,4-hexafluorobutyl acrylate instead of 2,2,3,3,-tetrafluoropropyl acrylate in the shell-building step. The fluoropolymer contents in the attained particles were determined by proton NMR, in $CDCl_3$. It had been found that the fluoropolymer content with respect to PMMA core was 13.8 wt %. The size of attained PMMA particles ranged from 250~350 nm.

Example 6

Following the same procedure as described in example 3, the core-shell fluorinated particles was prepared by using same quantity of 2,2,3,4,4,4-hexafluorobutyl acrylate instead of 2,2,3,3,-tetrafluoropropyl acrylate in the shell-building step. The fluoropolymer content in the attained particles was determined by proton NMR, in $CDCl_3$. It had been found that the fluoropolymer content with respect to PMMA core was 11.87 wt %. The size of the attained PMMA particles ranged from 295~450 nm.

Example 7

The Preparation of Core-Shell Fluorinated Particles with PMMA in the Core and poly(3,3,4,4,5,5,6,6,7,7,8,8,8-tridecafluorooctyl acrylate) in the Shell The efficient incorporation of poly(3,3,4,4,5,5,6,6,7,7,8,8,8-tridecafluorooctyl acrylate) onto the PMMA seed particles can be carried out in a three-stage process in one-pot. The as-prepared dispersion of core-shell particles of PMMA-P(2,2,3,3-tetrafluoropropyl acrylate) was used as seed to form core-shell fluorinated particles containing (3,3,4,4,5,5,6,6,7,7,8,8,8-tridecafluorooctyl acrylate) in shell.

In a typical procedure, 12 mL of PMMA-P(2,2,3,3-tetrafluoropropyl acrylate) dispersion was taken from the stock emulsion and degassed by nitrogen for 30 minutes. 50 μL of (3,3,4,4,5,5,6,6,7,7,8,8,8-tridecafluorooctyl acrylate) monomer was added into the seed latex at room temperature, using a nitrogen-purged needle. The mixture was stirred for 24 hours. The mixture was then heated to 60° C., and water solution of potassium persulfate (5 mg, 10 mol % with respect to 13FA monomer) was injected to trigger the polymerization. The mixture was cooled down to room temperature after 24 hours. The particles can be easily separated by filtration. The solid was dried for 48 hours at 45° C., and the powder-form of the product was collected.

Example 8

Dispersion of Core-Shell Fluorinated Particles with PMMA in the Core and poly(2,2,3,4,4,4-hexafluorobutyl acrylate) as an Additive to Commercial Latex Fixed amount of PMMA-Poly(2,2,3,4,4,4-hexafluorobutyl acrylate) (solid content-5%) was blended with commercial latex (solid content=40%). The mixture was agitated for 30 minute using a shaker, to form white-color emulsion without noticeable particle agglomeration. The film forming process was carried out on a microscope glass cover slide. In the drying process, the water was evaporated slowly at ambient temperature. The film was further dried in an oven at 60° C. for 24 hours. The water contact angle increased progressively with increasing fluorinated particle composition. When PMMA-Poly(2,2,3,4,4,4-hexafluorobutyl acrylate) content was 27.3% i.e. fluorinated polymer content is 3.1 wt % (Table 2, entry 5), the contact angle was 107.4°, which was 20 degrees higher than the pristine latex film. This clearly indicated the effect of added fluoro-materials which reduced the hydrophilicity of the latex film.

TABLE 2

Effect of PMMA-PF6 on commercial latex for derived polymer film hydrophilicity

| No | Latex:PMMA-PF6 (v/v) | PMMA-PF6 Content (%) | Contact Angle | Δ CA |
|---|---|---|---|---|
| 1 | 1:0 | 0 | 86.9 | — |
| 2 | 3:1 | 4.0 | 96.2 | 9.4 |
| 3 | 2:1 | 5.9 | 100.3 | 13.5 |
| 4 | 1:1 | 11.1 | 102.8 | 16.0 |
| 5 | 1:3 | 27.3 | 107.4 | 20.6 |

Example 9

Core-Shell Fluorinated Particles with PMMA in the Core and poly(3,3,4,4,5,5,6,6,7,7,8,8,8-tridecafluorooctyl acrylate) as an Additive to PVC The PVC film was prepared from a toluene solution containing 15 wt % PVC and 0.5 wt % core-shell fluorinated particles with poly(3,3,4,4,5,5,6,6,7,7,8,8,8-tridecafluorooctyl acrylate) in the shell. After drying in air, the film was annealed at 130° C. for 1 hour. The water contact angle was 115°.

The invention claimed is:

1. A process for preparing fluorinated core-shell polymer particles in which the core is a non-fluorinated polymer and the shell is derived from at least 50% by weight of fluorinated monomers, comprising the steps of
   (1) synthesizing a core polymer latex by aqueous emulsion polymerization of non-fluorinated monomers forming the core polymer,
   (2) adding the shell-forming fluorinated monomers or mixtures of at least 50% by weight of fluorinated monomers with non-fluorinated monomers to the core polymer latex of step 1) and allowing for at least one hour of equilibration time in which essentially no polymerization of the shell monomers occurs,
   (3) reacting the shell-forming monomers in the mixture from step 2) to form the core-shell polymer particles, wherein the process steps 1) to 3) are carried out under mechanical stirring in the absence of surfactants, emulsifiers, emulsifying monomers and mixtures thereof.

2. The process according to claim 1, wherein the shell is derived from at least 75% by weight, of fluorinated monomers.

3. The process according to claim 2, wherein the shell is derived from at least 95% by weight, of fluorinated monomers.

4. The process according to claim 1, wherein the synthesizing to form the core polymer latex in step 1) and the reacting of the shell-forming monomers in step 3) are free-radical polymerizations.

5. The process according to claim 4, wherein in steps 1) and 3), but not in step 2), free-radical polymerization starter is added to perform the free-radical polymerizations.

6. The process according to claim 1, wherein the non-fluorinated monomers for forming the core polymer are selected from the group consisting of acrylate-based monomers, methacrylate-based monomers, styrene-based monomers, vinyl-based monomers and mixtures thereof.

7. The process according to claim 6, wherein the non-fluorinated monomers are selected from $C_{1-12}$-alkyl(meth)acrylates.

8. The process according to claim 1, wherein the fluorinated monomers are selected from alkyl(meth)acrylates having fluorinated alkyl residues.

9. The process according to claim 1, wherein the average particle diameter is in the range of from 80 to 800 nm.

10. A fluorinated core-shell-polymer particle, obtained by a process as claimed in claim 1.

11. Process for forming a solid water-, oil- and soil-repellent coating film on solid surfaces, involving the steps of
   a) casting a coating film of an aqueous latex dispersion containing a fluorinated core shell-polymer particle as defined in claim 1, on a solid surface,
   b) evaporating the aqueous dispersion medium and
   c) annealing the coating film.

12. The process as claimed in claim 11, wherein the aqueous latex dispersion contains a mixture of a fluorinated core-shell-polymer particle admixed with non-fluorinated polymer particles, wherein the fluorinated core-shell polymer particle is obtained by a process for preparing fluorinated core-shell polymer particles in which the core is a non-fluorinated polymer and the shell is derived from at least 50% by weight of fluorinated monomers comprising the steps of
   1) synthesizing a core polymer latex by aqueous emulsion polymerization of non-fluorinated monomers forming the core polymer,
   2) adding the shell-forming fluorinated monomers or mixtures of at least 50% by weight of fluorinated monomers with non-fluorinated monomers to the core polymer latex of step 1) and allowing for at least one hour of equilibration time in which essentially no polymerization of the shell monomers occurs,
   3) reacting the shell-forming monomers in the mixture from step 2) to form the core-shell polymer particles, wherein the process steps 1) to 3) are carried out under mechanical stirring in the absence of surfactants, emulsifiers, emulsifying monomers and mixtures thereof.

* * * * *